United States Patent
Wu

(10) Patent No.: US 11,884,154 B2
(45) Date of Patent: Jan. 30, 2024

(54) DETECTION SYSTEM

(71) Applicants: Inventec (Pudong) Technology Corp., Shanghai (CN); Inventec Corporation, Taipei (TW)

(72) Inventor: Cheng-Yu Wu, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 357 days.

(21) Appl. No.: 17/476,483

(22) Filed: Sep. 16, 2021

(65) Prior Publication Data
US 2022/0388394 A1 Dec. 8, 2022

(30) Foreign Application Priority Data
Jun. 7, 2021 (CN) .......................... 202110632448.5

(51) Int. Cl.
*B60K 35/00* (2006.01)
*G02B 27/01* (2006.01)
*B60R 1/00* (2022.01)
(Continued)

(52) U.S. Cl.
CPC ............... *B60K 35/00* (2013.01); *B60R 1/00* (2013.01); *G02B 27/0093* (2013.01); *G02B 27/017* (2013.01); *G06N 20/00* (2019.01); *G06V 20/597* (2022.01); *G06V 40/193* (2022.01); *H04W 4/48* (2018.02); *B60K 2370/148* (2019.05);
(Continued)

(58) Field of Classification Search
CPC ........ B60K 2370/148; B60K 2370/149; B60K 2370/1575; B60K 2370/176; B60K 2370/177; B60K 2370/178; B60K 2370/193; B60K 2370/194; B60K 2370/21; B60K 35/00; B60R 1/00; B60R 2300/802; G02B 2027/0178; G02B 27/0093; G02B 27/017; G06N 20/00; G06V 20/597; G06V 40/193; H04W 4/48
See application file for complete search history.

(56) References Cited

U.S. PATENT DOCUMENTS 9,756,319 B2 * 9/2017 Di Censo .................. B60R 1/00
9,906,769 B1 * 2/2018 Young .................. H04N 13/239
(Continued)

*Primary Examiner* — Tyler J Lee
(74) *Attorney, Agent, or Firm* — Winston Hsu

(57) ABSTRACT

A detection system for a vehicle comprises a blind spot detection module and a glasses module. The blind spot detection module comprises a first video recording device recording a vehicle surrounding image; a first identification device generating a blind spot identification result; a first determination device determining whether to transmit the vehicle surrounding image and/or a blind spot warning message; and a transmitting device transmitting the vehicle surrounding image and/or the blind spot warning message. The glasses module comprises a receiving device receiving the vehicle surrounding image and/or the blind spot warning message; a second video recording device recording a user surrounding image; a second identification device generating an eye identification result; a second determination device determining whether to transmit the user surrounding image and/or an eye warning message via an artificial intelligence (AI); and a display device displaying the user surrounding image and/or the eye warning message.

10 Claims, 3 Drawing Sheets

(51) Int. Cl.
*H04W 4/48* (2018.01)
*G06N 20/00* (2019.01)
*G02B 27/00* (2006.01)
*G06V 20/59* (2022.01)
*G06V 40/19* (2022.01)
*G06V 40/18* (2022.01)

(52) U.S. Cl.
CPC ............... *B60K 2370/1575* (2019.05); *B60K 2370/176* (2019.05); *B60K 2370/177* (2019.05); *B60K 2370/178* (2019.05); *B60R 2300/802* (2013.01); *G02B 2027/0178* (2013.01)

(56) References Cited

U.S. PATENT DOCUMENTS

| | | | | |
|---|---|---|---|---|
| 10,996,469 | B2* | 5/2021 | Huh | G08G 1/167 |
| 11,340,701 | B2* | 5/2022 | Jiang | G06V 40/171 |
| 2010/0253541 | A1* | 10/2010 | Seder | G08G 1/0962 |
| | | | | 340/905 |
| 2014/0211319 | A1* | 7/2014 | Park | G02B 27/01 |
| | | | | 359/630 |
| 2015/0245017 | A1* | 8/2015 | Di Censo | G08G 1/167 |
| | | | | 348/51 |
| 2015/0309562 | A1* | 10/2015 | Shams | G08B 6/00 |
| | | | | 345/8 |
| 2016/0003636 | A1* | 1/2016 | Ng-Thow-Hing | G01C 21/365 |
| | | | | 701/418 |
| 2016/0187651 | A1* | 6/2016 | Border | G06F 3/011 |
| | | | | 345/8 |
| 2017/0187963 | A1* | 6/2017 | Lee | G02B 27/01 |
| 2017/0291543 | A1* | 10/2017 | Goldman-Shenhar | B60Q 9/00 |
| 2020/0192091 | A1* | 6/2020 | Huh | G08G 1/167 |
| 2021/0088784 | A1* | 3/2021 | Whitmire | G02B 27/0101 |
| 2021/0181837 | A1* | 6/2021 | Jiang | G06V 10/82 |
| 2021/0182625 | A1* | 6/2021 | Arar | G06V 40/193 |
| 2021/0183072 | A1* | 6/2021 | Puri | G06N 3/08 |

* cited by examiner

DETECTION SYSTEM

CROSS REFERENCE TO RELATED APPLICATION

This non-provisional application claims priority of China patent application No. 202110632448.5, filed on 7 Jun. 2021, included herein by reference in its entirety.

BACKGROUND OF THE INVENTION

1. Field of the Invention

The present invention relates to a detection system, and more particularly, to a detection system of detecting blind spots of a vehicle and eyes of a user.

2. Description of the Prior Art

A driver may cause a vehicle accident due to blind spots (e.g., in a line of sight or A-pillars) or due to driving in a trance state and not paying attention to people and things surrounding a vehicle of the driver. It is difficult to avoid occurrence of the vehicle accident because current functions of the vehicle for detecting surrounding situation of the vehicle and driving states of the driver are limited. Thus, how to detect the surrounding situation of the vehicle and the driving states of the driver is an important problem to be solved.

SUMMARY OF THE INVENTION

The present invention therefore provides a detection system of detecting blind spots of a vehicle and eyes of a user to solve the abovementioned problem.

According to an example, the detection system of the present invention comprises a blind spot detection module and a glasses module. The blind spot detection module comprises a first video recording device, for recording a vehicle surrounding image; a first identification device, for identifying at least one driving blind spot, to generate a blind spot identification result; a first determination device, coupled to the first video recording device and the first identification device, for determining whether to transmit at least one of the vehicle surrounding image and a blind spot warning message according to the vehicle surrounding image and the blind spot identification result, to generate a first determination result; and a transmitting device, coupled to the first determination device, for transmitting the at least one of the vehicle surrounding image and the blind spot warning message according to the first determination result. The glasses module comprises a receiving device, for receiving the at least one of the vehicle surrounding image and the blind spot warning message from the transmitting device; a second video recording device, for recording a user surrounding image; a second identification device, for identifying eyes of a user, to generate an eye identification result; a second determination device, coupled to the second video recording device and the second identification device, for determining whether to display at least one of the user surrounding image and an eye warning message via an artificial intelligence (AI) according to the user surrounding image and the eye identification result, to generate a second determination result; and a display device, coupled to the receiving device and the second determination device, for displaying the at least one of the user surrounding image and the eye warning message according to the second determination result, and for displaying the vehicle surrounding image and the blind spot warning message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
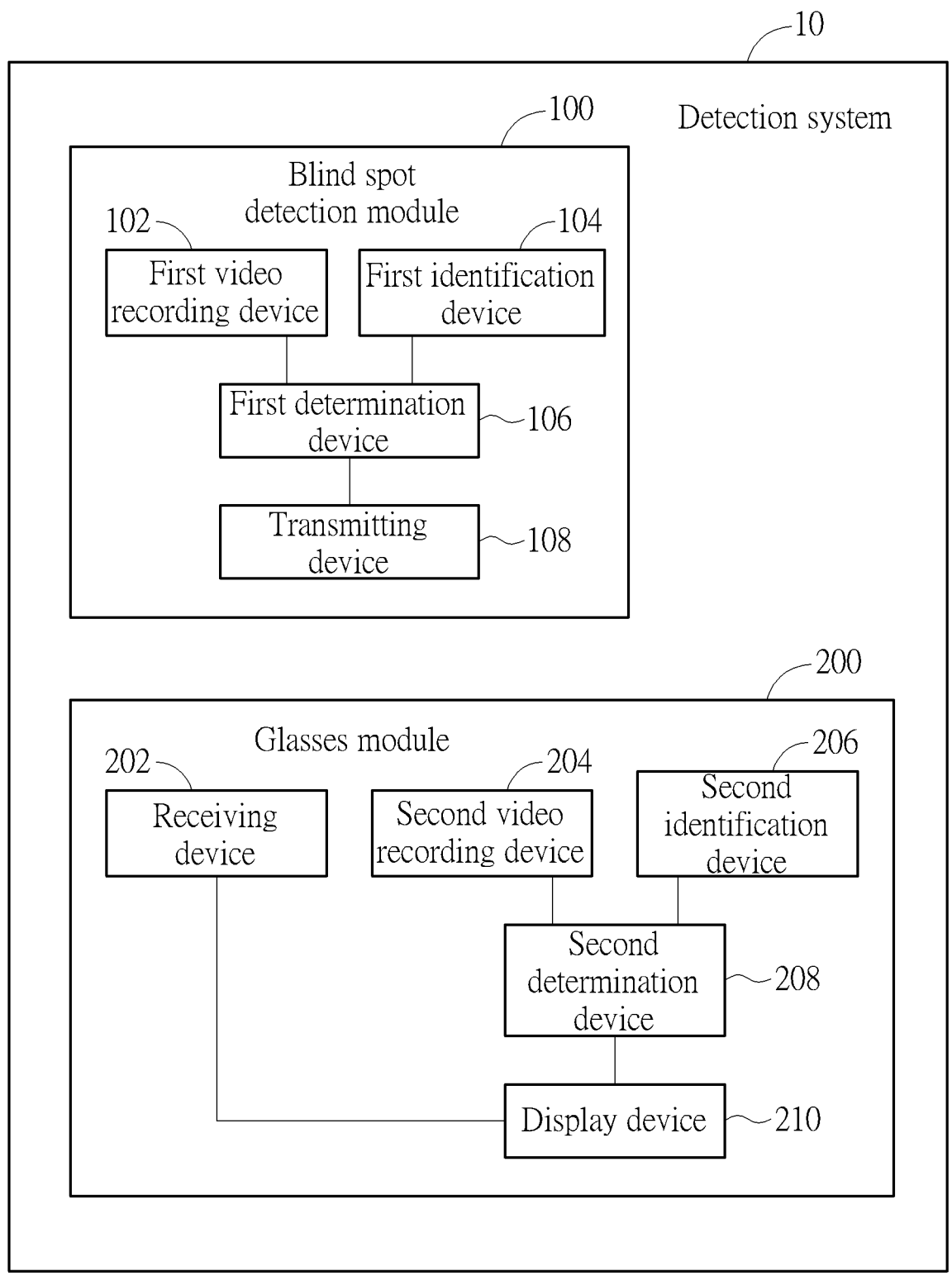
FIG. 1 is a schematic diagram of a detection system according to an example of the present invention.

FIG. 1 is a schematic diagram of a detection system 10 according to an example of the present invention. The detection system 10 includes a blind spot detection module 100 and a glasses module 200. The blind spot detection module 100 includes a first video recording device 102 (e.g., rear loading vehicle video recorder), a first identification (e.g., recognition) device 104, a first determination device 106 and a transmitting device 108. The glasses module 200 includes a receiving device 202, a second video recording device 204 (e.g., video recorder), a second identification device 206, a second determination device 208 and a display device 210.

In FIG. 1, the first video recording device 102 is for recording a vehicle surrounding image. The first identification device 104 is for identifying (e.g., recognizing) at least one driving blind spot, to generate a blind spot identification result. The first determination device 106 is coupled to the first video recording device 102 and the first identification device 104. The first determination device 106 determines whether to transmit at least one of the vehicle surrounding image and a blind spot warning message according to the vehicle surrounding image and the blind spot identification result, to generate a first determination result. The transmitting device 108 is coupled to the first determination device 106. The transmitting device 108 transmits the at least one of the vehicle surrounding image and the blind spot warning message according to the first determination result.

In one example, the vehicle surrounding image includes a vehicle panoramic image. The vehicle panoramic image includes images of the front of the vehicle, images of the rear of the vehicle and images of two sides of the vehicle. In one example, the blind spot warning message includes at least one of a video message and a voice message. For example, the detection system 10 provides images (e.g., image messages) of the blind spot/vehicle deviation and/or makes (e.g., sends, alerts) warning sounds (e.g., voice messages) to remind a user (e.g., driver) to pay attention, when a vehicle (e.g., a rear loading vehicle) is turning and there are other vehicles or pedestrians in the blind spot or when the vehicle deviates from a lane. In one example, the transmitting device 108 includes a first communication module for performing a first millimeter wave wireless transmission. The transmitting device 108 transmits the at least one of the vehicle surrounding image and the blind spot warning message via the first millimeter wave wireless transmission.

In FIG. 1, the receiving device 202 is for receiving the at least one of the vehicle surrounding image and the blind spot warning message from the transmitting device 108. The second video recording device 204 is for recording a user surrounding image. The second identification (e.g., recognition) device 206 is for identifying eyes of a user, to generate an eye identification result. The second determination device 208 is coupled to the second video recording device 204 and the second identification device 206. The second determination device 208 determines whether to display at least one of the user surrounding image and an eye warning message via an artificial intelligence (AI) according to the user surrounding image and the eye identification result, to generate a second determination result. The display device 210 is coupled to the receiving device 202 and the second determination device 208. The display device 210 displays the at least one of the user surrounding image and the eye warning message according to the second determination result. The display device 210 displays the vehicle surrounding image and the blind spot warning message (e.g., according to the second determination result).

In one example, the glasses module 200 is an augmented reality (AR) glasses module or a mixed reality (MR) glasses module. In one example, the receiving device 202 includes a second communication module for performing a second millimeter wave wireless transmission. The receiving device 202 receives the at least one of the vehicle surrounding image and the blind spot warning message via the second millimeter wave wireless transmission. In one example, the second identification device 206 identifies (e.g., recognizes) an eyeball rotation direction of the eyes of the user. For example, a user (e.g., driver) should pay attention to other vehicles or pedestrians in the direction of the turn, when a vehicle is turning. In this situation, the second identification device 206 identifies whether eyeballs of the user rotate to a corresponding direction. For example, the second identification device 206 identifies the eyeball rotation direction of the eyes of the user to determine whether the user pays attention to the left approaching vehicles and/or right approaching vehicles, when a vehicle of the user passes through an intersection. In one example, the second identification device 206 identifies (e.g., recognizes) an eyelid closed situation of the eyes of the user to determine whether the user is dozing off or in a trance state.

In one example, the second determination device 208 determines whether there are other objects in the blind spot of the line of sight of the user and determines whether the vehicle of the user deviates from the lane via the AI (e.g., AI labeling) according to the user surrounding image. In one example, the eye warning message includes at least one of a video message and a voice message. For example, the glasses module 200 provides images (e.g., image messages) in the blind spot of the line of sight and/or makes warning sounds (e.g., voice messages) to remind a user (e.g., driver) to pay attention, when there are other vehicles or pedestrians in the blind spot of the line of sight. For example, the glasses module 200 makes warning sounds (e.g., voice messages), when the user is dozing off or in a trance state. In one example, the display device 210 is a micro light-emitting diode (LED) display device.

Figure 2:
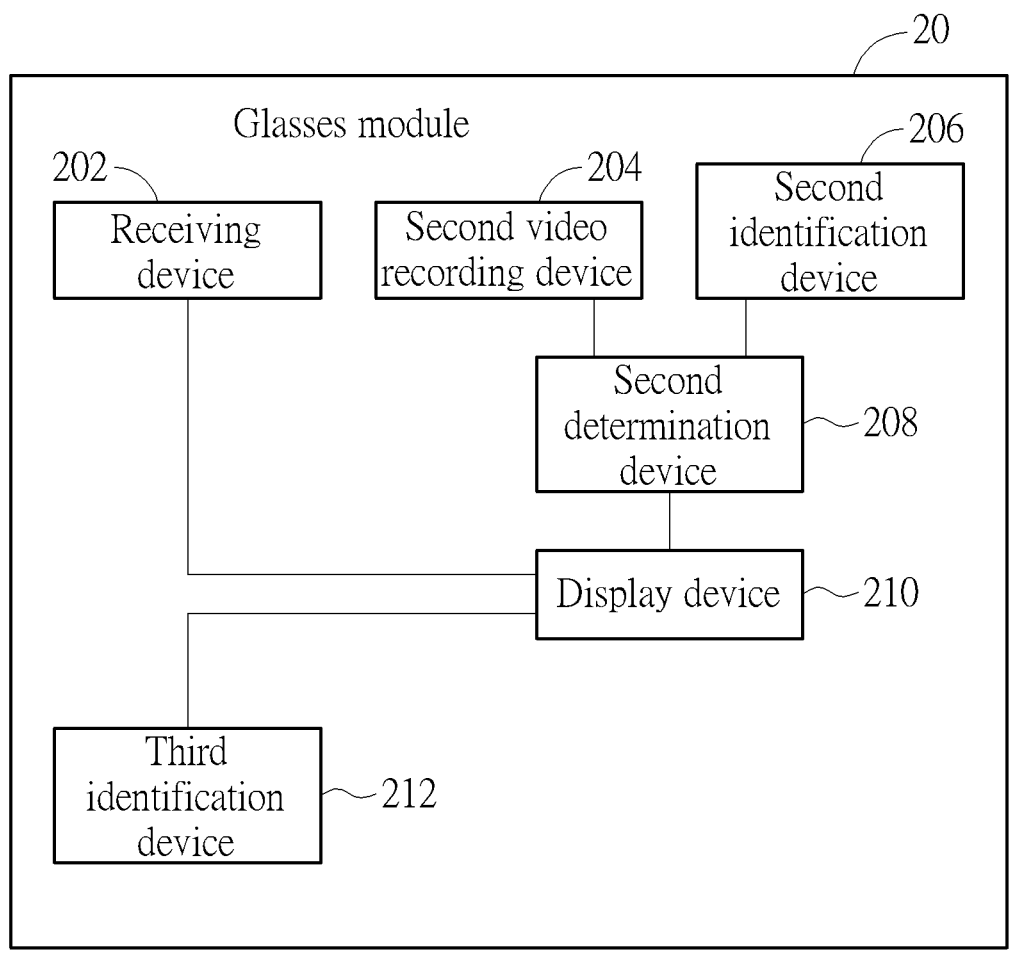
FIG. 2 is a schematic diagram of a glasses module according to an example of the present invention.

FIG. 2 is a schematic diagram of a glasses module 20 according to an example of the present invention. The glasses module 20 includes a receiving device 202, a second video recording device 204, a second identification device 206, a second determination device 208, a display device 210 and a third identification device 212. The glasses module 20 in FIG. 2 may be applied to the glasses module 200 in FIG. 1. The receiving device 202, the second video recording device 204, the second identification device 206, the second determination device 208 and the display device 210 may refer to FIG. 1, and are not repeated herein. The third identification device 212 is coupled to the display device 210 and is for identifying a voice command of the user. The display device 210 displays at least one of the vehicle surrounding image and the user surrounding image corresponding to the voice command according to the voice command. For example, the display device 210 displays the vehicle panoramic image or the vehicle rear image according to the voice command "reverse" of the user, when the vehicle is reversing. For example, the display device 210 displays the vehicle side (e.g., left side) image according to the voice command "turn" of the user, when the vehicle is turning (e.g., turning left).

Figure 3:
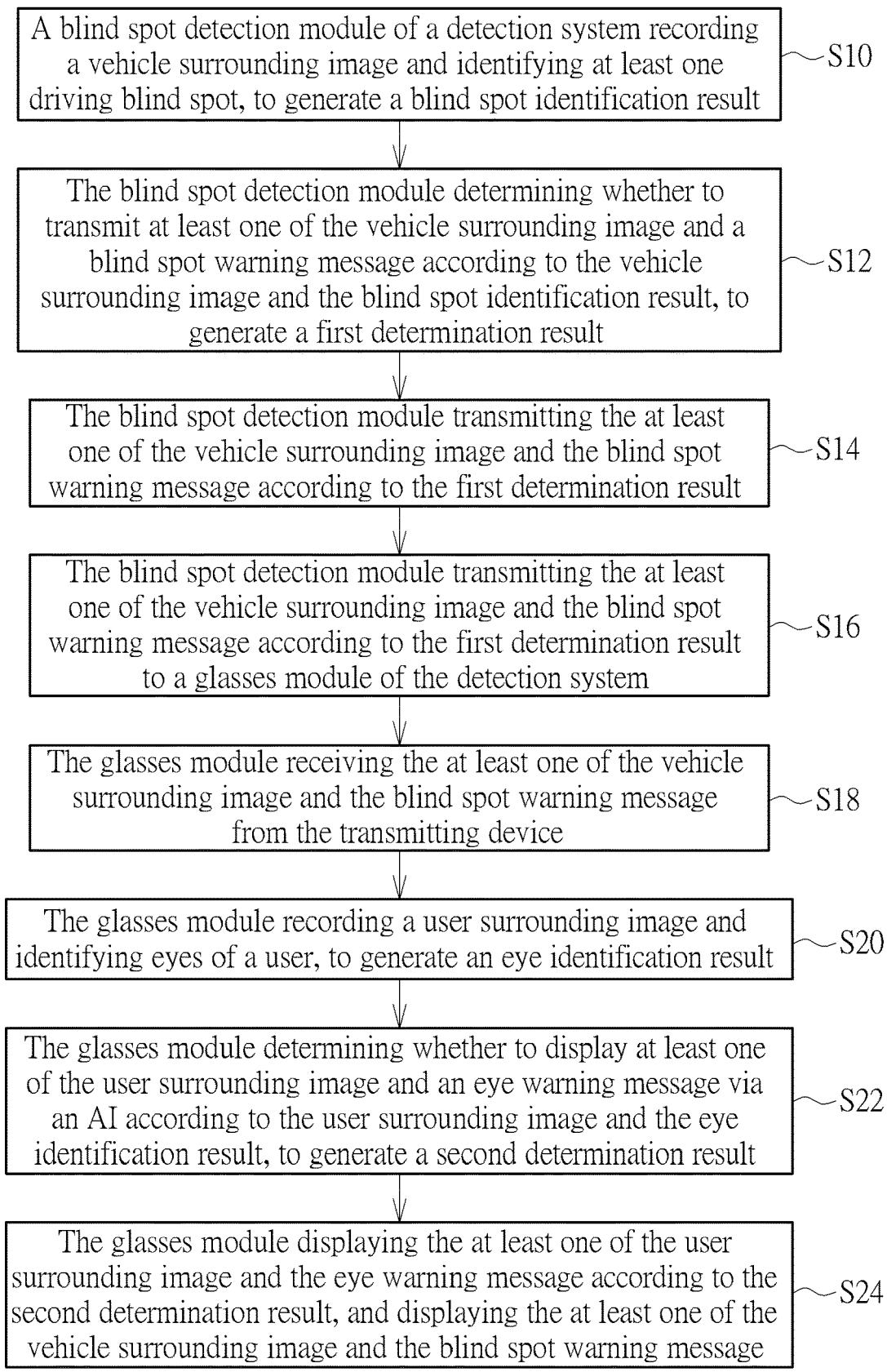
FIG. 3 is a schematic diagram of a detection method according to an example of the present invention.

FIG. 3 is a schematic diagram of a detection method according to an example of the present invention. The detection method of the present invention includes the following steps. A blind spot detection module of a detection system records a vehicle surrounding image and identifies at least one driving blind spot, to generate a blind spot identification result (step S10). The blind spot detection module determines whether to transmit at least one of the vehicle surrounding image and a blind spot warning message according to the vehicle surrounding image and the blind spot identification result, to generate a first determination result (step S12). The blind spot detection module transmits the at least one of the vehicle surrounding image and the blind spot warning message according to the first determination result (step S14). Then, the blind spot detection module transmits the at least one of the vehicle surrounding image and the blind spot warning message according to the first determination result to a glasses module of the detection system (step S16). The glasses module receives the at least one of the vehicle surrounding image and the blind spot warning message from the transmitting device (step S18). The glasses module records a user surrounding image and identifies eyes of a user, to generate an eye identification result (step S20). The glasses module determines whether to display at least one of the user surrounding image and an eye warning message via an AI according to the user surrounding image and the eye identification result, to generate a second determination result (step S22). The glasses module displays the at least one of the user surrounding image and the eye warning message according to the second determination result and displays the at least one of the vehicle surrounding image and the blind spot warning message (step S24).

Please refer to FIG. 1 and FIG. 2 for the examples of the detection method of the present invention. The examples are not repeated herein.

To sum up, the present invention provides a detection system. The detection system detects the vehicle surrounding (e.g., driving blind spot) situation and whether the user driving the vehicle is dozing off or in the trance state via the AI according to the image recorded by the video recording device and the identification result generated by the identification device. As a result, the detection system may alert the user immediately, if there is a critical situation while the user is driving the vehicle. Thus, occurrence of vehicle accidents may be reduced effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection system, comprising:
a blind spot detection module, comprising:
- a first video recording device, for recording a vehicle surrounding image;
- a first identification device, for identifying at least one driving blind spot, to generate a blind spot identification result;
- a first determination device, coupled to the first video recording device and the first identification device, for determining whether to transmit at least one of the vehicle surrounding image and a blind spot warning message according to the vehicle surrounding image and the blind spot identification result, to generate a first determination result; and
- a transmitting device, coupled to the first determination device, for transmitting the at least one of the vehicle surrounding image and the blind spot warning message according to the first determination result; and a glasses module, comprising:
- a receiving device, for receiving the at least one of the vehicle surrounding image and the blind spot warning message from the transmitting device;
- a second video recording device, for recording a user surrounding image;
- a second identification device, for identifying eyes of a user, to generate an eye identification result;
- a second determination device, coupled to the second video recording device and the second identification device, for determining whether to display at least one of the user surrounding image and an eye warning message via an artificial intelligence (AI) according to the user surrounding image and the eye identification result, to generate a second determination result; and
- a display device, coupled to the receiving device and the second determination device, for displaying the at least one of the user surrounding image and the eye warning message according to the second determination result, and for displaying the vehicle surrounding image and the blind spot warning message.

2. The detection system of claim 1, wherein the vehicle surrounding image comprises a vehicle panoramic image.

3. The detection system of claim 1, wherein the blind spot warning message comprises at least one of a video message and a voice message.

4. The detection system of claim 1, wherein the transmitting device comprising:
- a first communication module, for performing a first millimeter wave wireless transmission, wherein the transmitting device transmits the at least one of the vehicle surrounding image and the blind spot warning message via the first millimeter wave wireless transmission.

5. The detection system of claim 1, wherein the glasses module is an augmented reality (AR) glasses module or a mixed reality (MR) glasses module.

6. The detection system of claim 1, wherein the glasses module further comprising:
- a third identification device, coupled to the display device, for identifying a voice command of the user, wherein the display device displays at least one of the vehicle surrounding image and the user surrounding image corresponding to the voice command according to the voice command.

7. The detection system of claim 1, wherein the receiving device comprising:
- a second communication module, for performing a second millimeter wave wireless transmission, wherein the receiving device receives the at least one of the vehicle surrounding image and the blind spot warning message via the second millimeter wave wireless transmission.

8. The detection system of claim 1, wherein the second identification device identifies at least one of an eyeball rotation direction and an eyelid closed situation of the eyes of the user.

9. The detection system of claim 1, wherein the eye warning message comprises at least one of a video message and a voice message.

10. The detection system of claim 1, wherein the display device is a micro light-emitting diode (LED) display device.

* * * * *